United States Patent [19]

Handwerker

[11] Patent Number: 5,549,956
[45] Date of Patent: Aug. 27, 1996

[54] HEAT REFLECTIVE BLANKET

[76] Inventor: Gary Handwerker, 2311 Burr Oak Rd., Northfield, Ill. 60093

[21] Appl. No.: 417,792

[22] Filed: Apr. 6, 1995

[51] Int. Cl.$^6$ ............... B32B 3/12; B32B 7/00; B32B 1/00
[52] U.S. Cl. ............ 428/73; 428/116; 428/120; 428/178
[58] Field of Search ............... 428/116, 178, 428/72, 73, 119, 120, 166

[56] References Cited

U.S. PATENT DOCUMENTS

| | | |
|---|---|---|
| 3,420,022 | 1/1969 | Brock . |
| 3,604,324 | 9/1971 | Middlestadt . |
| 3,619,340 | 11/1971 | Jones ........................ 161/127 |
| 3,676,641 | 7/1972 | Olson . |
| 4,038,447 | 7/1977 | Brock . |
| 4,117,641 | 10/1978 | Wells . |
| 4,304,824 | 12/1981 | Karpinski ..................... 428/69 |
| 4,313,993 | 2/1982 | McGlory ...................... 428/178 |
| 4,315,962 | 2/1982 | Skoien ........................ 428/12 |
| 4,396,454 | 8/1983 | Brys et al. . |
| 4,401,707 | 8/1983 | Bailey et al. ................. 428/166 |
| 4,420,521 | 12/1983 | Carr ........................... 428/74 |
| 4,485,137 | 11/1984 | White . |
| 4,549,323 | 10/1985 | Brockhaus .................... 5/455 |
| 4,945,924 | 8/1990 | Poettgen . |
| 4,961,238 | 10/1990 | Limb et al. . |
| 5,072,455 | 12/1991 | St. Olson . |
| 5,224,832 | 7/1993 | Gonczy et al. . |
| 5,281,458 | 1/1994 | Adams . |
| 5,304,408 | 4/1994 | Jaroxz et al. . |
| 5,345,621 | 9/1994 | Livingston . |

*Primary Examiner*—James Withers

[57] ABSTRACT

An improved flexible multilayer heat reflective blanket for use in the curing of concrete and other insulative uses. Also disclosed is an improved method of insulation incorporating the heat reflective characteristics of metallic foil layers. The blanket comprises thermoplastic, moisture-impervious outer surface layers which enclose insulative layers and heat reflective layers of aluminum foil or like heat reflective materials. The foil layers contain the heat radiating from the surface to be insulated by reflecting heat escaping through the insulative layers of the blanket back through the insulative layers towards the insulated surface, resulting in a heat reflective blanket with increased thermal resistance without a corresponding increase in thickness. The use of heat reflective layers obviates the need for additional layers of insulation resulting in a thinner, lightweight and more flexible heat reflective blanket.

18 Claims, 2 Drawing Sheets

HEAT REFLECTIVE BLANKET

FIELD OF THE INVENTION

This invention relates to multilayer heat reflective blankets. More particularly, this invention relates to heat reflective blankets useful for curing concrete. This invention also relates to a method of heat reflection incorporating reflective foil layers within the blanket which provide increased thermal resistance without a corresponding increase in blanket thickness.

BACKGROUND OF THE INVENTION

During the concrete curing process, chemical changes occur in the presence of water which ensure that the hardened concrete will be water-tight and durable. These chemical changes occur over a considerable period of time requiring that the concrete be kept wet during the curing period. The heat radiating from the concrete during the curing process evaporates the moisture in the concrete, inhibiting the chemical hardening process and compromising the strength and durability of the cured concrete. It is therefore necessary to contain the heat and moisture in the concrete long enough to permit the curing process to be sufficiently completed. This need for heat and moisture retention increases during cold weather applications.

Conventional methods of heat retention include the use of straw, sawdust and cloth blankets as insulating materials to prevent the premature drying of the concrete. These materials absorb water, are cumbersome and time consuming to remove from the concrete, cannot be effectively reused and may be subject to deterioration from the chemicals in the concrete. Moisture-impervious blankets using foam, fiberglass and like materials as insulation have been developed. However, fiberglass filling for curing blankets forms into small clusters or balls when wet, migrating to the corner of the blanket, thus destroying the insulating quality of the fiberglass. Open celled foam insulating material also absorbs water, which reduces the insulative efficiency of the foam material. Since the curing blankets which are the subject of the present invention are susceptible to accidental rips and tears, even blankets comprising moisture-impervious outer layers face the risk of water contacting the internal insulative layer or layers.

With decreasing temperatures the need for increased thermal insulation requires the use of additional layers of insulation resulting in insulation blankets of greater thickness when presently available blankets are used. These thicker insulation blankets can be relatively heavy and cumbersome to use, hampering portability. Additionally, their relative inflexibility reduces effectiveness when used on irregular concrete surfaces.

The present invention overcomes these and other problems inherent in existing multilayer insulation blankets. The present invention combines moisture-impervious outer layers and insulative layers with heat reflective layers that increase the thermal resistance of the blanket without increasing the blanket thickness.

OBJECTS OF THE INVENTION

The principle object of the present invention is to provide an improved multilayer heat reflective blanket exhibiting increased thermal resistance without a corresponding increase in blanket thickness.

Another object of the invention is to provide an efficient and cost effective method of improving the insulative characteristics of multilayer insulation blankets without increasing the number and thickness of insulation layers used.

A further object of the invention is to provide a flexible multilayer heat reflective blanket that is relatively supple and drapable over irregular surfaces.

A further object of the invention is to provide a moisture-impervious multilayer heat reflective blanket that is not subject to bacterial degradation from contact with the surface to be insulated.

A further object of the invention is to provide a lightweight and portable multilayer heat reflective blanket that can be easily rolled, transported and stored.

A further object of the invention is to provide a multilayer heat reflective blanket that is efficiently removable and effectively reusable for subsequent applications. Still further objects and advantages will become apparent from a consideration of the ensuing description and drawings.

SUMMARY OF THE INVENTION

These and other objects are achieved by an improved multilayer heat reflective concrete curing blanket, and a method of heat reflection improving the insulative characteristics of insulation blankets without increasing the thickness of same. In the improved invention, the moisture-impervious outer layers enclose at least one insulative layer and at least one heat reflective foil layer. The heat reflective layer reflects heat radiating from the surface to be insulated and passing through the insulative layer back through the insulative layers, thereby increasing the heat retentive quality of the blanket. The improved blanket includes the use of an insulative layer comprising spaced insulative pockets defining open spaces between the insulative pockets. This configuration improves the heat retentive quality of the improved blanket whereby the insulative pockets impede the passage of heat radiating from the curing concrete, while the open spaces permit the passage of heat reflected from the foil layer back towards the curing concrete.

DETAILED DESCRIPTION OF THE PREFERRED EMBODIMENTS

Figure 1:
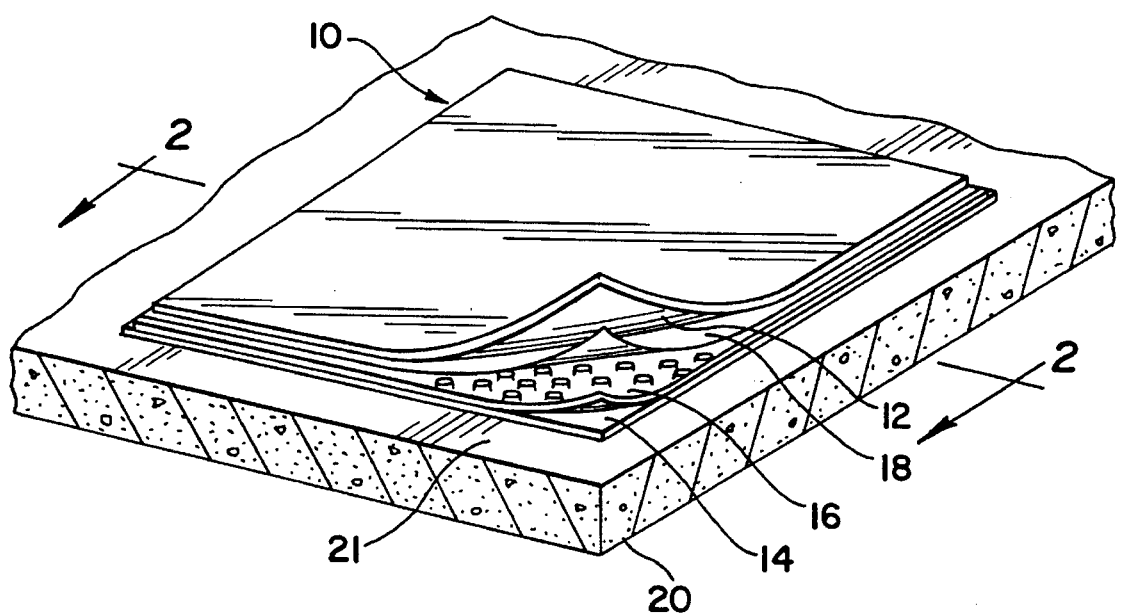
FIG. 1 is a perspective view of the overlying layers of one embodiment of a heat reflective blanket of the present invention disposed on top of a concrete slab.

FIG. 1 is a perspective view of the overlying layers of one embodiment of a heat reflective blanket of the present invention disposed on top of a concrete slab. In FIG. 1, a heat reflective blanket 10 comprises first and second outer layers 12, 14 which enclose an insulative layer 16 and a heat reflective foil layer 18. Outer layer 14 is disposed on top of the concrete slab 20. The outer layers 12, 14 are preferably constructed of plastic compounds such as polyethylenes, polyesters, cellophanes and like moisture-impervious materials which protect the interior insulative layer 16 from environmental conditions existing outside the blanket 10. The outer layers 12, 14 may also be constructed of other moisture-impervious materials, such as waterproofed canvas or other suitable fibrous materials. Besides functioning as moisture barriers, the outer layers 12, 14 are constructed of materials that do not adhere to the curing concrete 20 and have relatively smooth outer surfaces so as not to leave any marks or impressions on the concrete surface 21. In a preferred embodiment the outer layers are constructed of fire resistant materials to promote safety on the construction work site where flame heaters may be used to provide additional heat for the concrete curing process especially during colder days. Additionally, the outer layers 12, 14 are constructed of materials that are not subject to bacterial degradation from contact with the chemicals present in the concrete slab 20 during the curing process, resulting in a blanket that is effectively reusable and inherently more cost effective than existing insulation blankets.

The insulative layer 16 is preferably constructed of air filled pockets 22 or like insulative elements, as illustrated, preferably in ¼ and ½ inch thicknesses. The thickness of the insulative layer 16 may vary according to the blanket's purpose. The insulative pockets or elements 22 are disposed in spaced relation to each other on the surface of the insulative layer 16, defining open spaces 24 between them. The heat reflective layer 18 may be constructed of aluminum foil or like metallic heat reflective materials, such as silver or gold. In the preferred embodiment the foil layer is constructed in thicknesses of one to two mils.

The improved blanket 10 of the present invention is generally rectangular in shape having preferred dimensions of six feet by twenty five feet, with possible further embodiments including square, circular or custom designed shapes for specific applications. The multiple layers of the present invention are preferably joined using stitching, heat sealing or buttons along the edges of the blanket and within the body of the blanket in rectangular or other suitable patterns.

Figure 2:
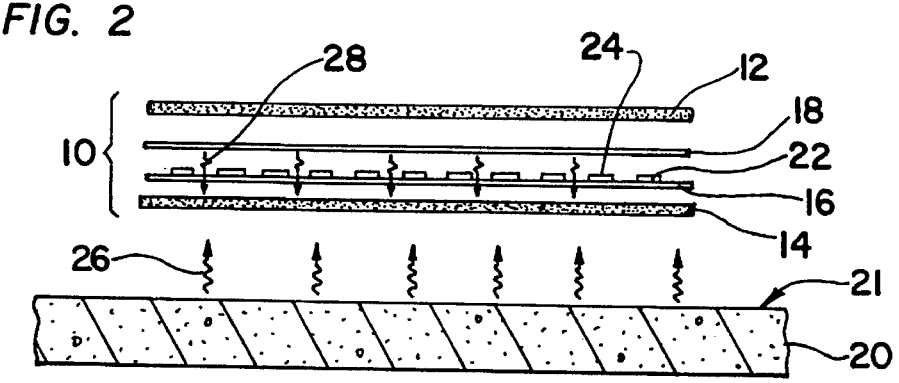
FIG. 2 is an expanded cross-sectional view taken through line 2—2 of FIG. 1.
Figure 3:
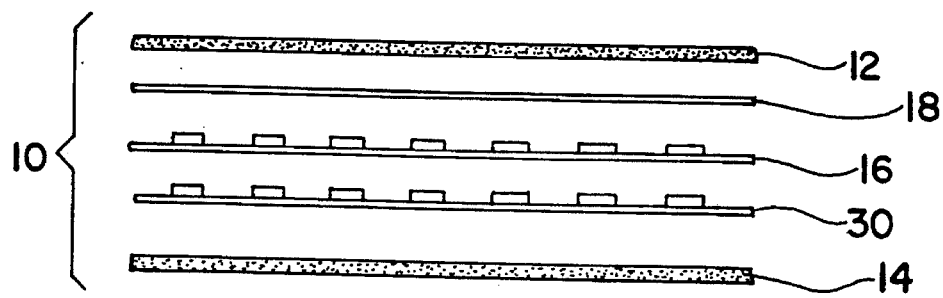
FIG. 3 is an expanded cross-sectional view of a further embodiment of a heat reflective blanket of the present invention.
Figure 4:
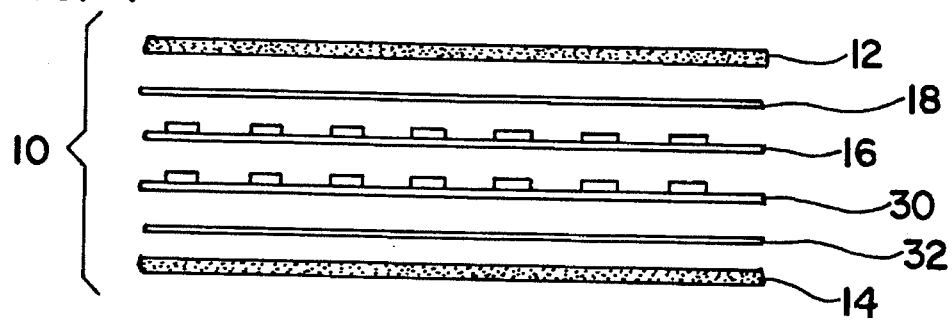
FIG. 4 is an expanded cross-sectional view of a further embodiment of a heat reflective blanket of the present invention.
Figure 5:
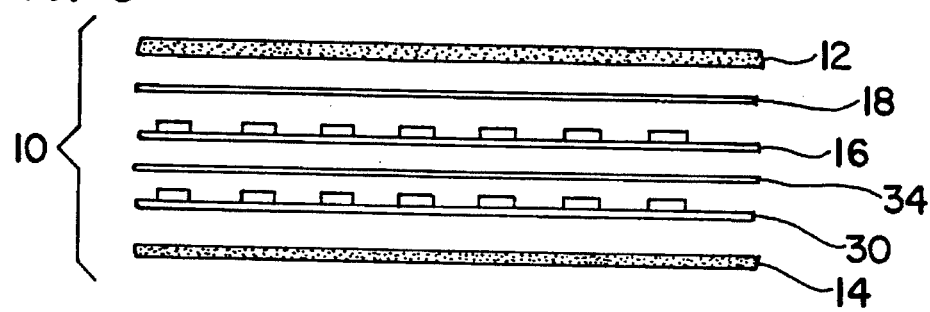
FIG. 5 is an expanded cross-sectional view of a further embodiment of a heat reflective blanket of the present invention.
Figure 6:
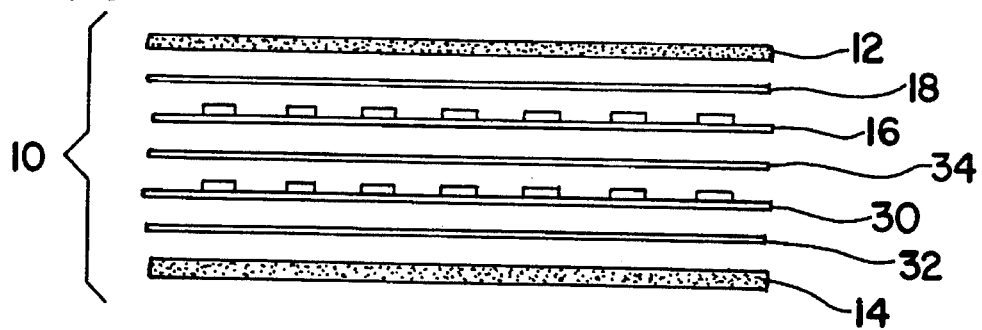
FIG. 6 is an expanded cross-sectional view of a further embodiment of a heat reflective blanket of the present invention.

FIG. 2 is an expanded cross-sectional view taken through line 2—2 of FIG. 1. In FIG. 2, the heat radiating from the concrete during the curing process is depicted by escaping heat arrows 26. The escaping heat 26 passes through the outer layer 14 of blanket 10 and is partially contained by the air pockets 22 of the insulative layer 16. The escaping heat 26 which penetrates the insulative layer 16 is then reflected off the heat reflective layer 18, as depicted by heat reflective arrows 28, back through the insulative layer 16 in the region of the open spaces 24 between the air pockets 22 and back through the outer layer 14, towards the concrete slab 20. This heat reflective process helps to contain the escaping heat 26 within the concrete slab 20 thereby preventing the evaporation of moisture necessary to ensure that the cured concrete is sufficiently durable and water-tight.

The heat reflective process described herein provides for the construction of improved multilayer heat reflective blankets exhibiting increased thermal resistance without a corresponding increase in blanket thickness. The addition of a layer or layers of heat reflective foil, each only several mils thick, represents a negligible increase in blanket thickness as compared to the existing practice of providing increased thermal resistance by adding layers of insulation. The use of heat reflective layers obviates the need for additional layers of insulation resulting in a thinner, lightweight and more flexible heat reflective blanket that can be easily rolled, transported and stored. Additionally, the increased flexibility of the improved blanket makes it more supple and drapable allowing for use on irregular concrete surfaces such as stairs. In such applications, existing blankets with their increased thicknesses are either not usable or inefficiently usable because of their inability to follow the irregular contours of the concrete structure.

FIGS. 3–6 depict additional embodiments of the present invention, in which multiple insulative layers 16, 30 and multiple heat reflective layers 18, 32, 34 may be used in the construction of blanket 10 to further enhance the insulative characteristics of the blanket, including embodiments wherein a heat reflective layer 34 is positioned between insulative layers 16, 30 and embodiments wherein a heat reflective layer 32 is positioned between heat insulative layer 30 and outer layer 14. Such embodiments further enhance the heat retentive quality of the blanket by allowing for successive heat reflective operations.

In further embodiments, heat reflective layers may be used in combination with conventional insulative materials such as fiberglass and open and closed celled foam. Such combinations will enhance the insulative quality of blankets using conventional insulation even when accidental tears in the outer layers expose the interior of the blanket to moisture thereby impairing the insulative quality of the fiberglass and open celled insulation. The heat reflective process of this invention is highly efficient and cost effective, useful for manufacturing insulation blankets with increased thermal efficiency whether using air filled pocket insulative material or conventional insulation.

Although in the foregoing detailed description the present invention has been described by reference to various embodiments, it will be understood that modifications in the structure and arrangement of those embodiments other than those specifically set forth herein may be achieved by those skilled in the art and that such modifications are to be considered as being within the overall scope of the present invention.

We claim:

1. A heat reflective blanket comprising:

a first moisture-impervious outer layer;

a second moisture-impervious outer layer;

at least one insulative layer disposed between said first and second outer layers;

said insulative layer including a plurality of insulative elements disposed in spaced relation to each other on a surface of said insulative layer, with open spaces defined in said surface between said insulative elements; and at least one heat reflective layer disposed between said first and second outer layers, reflecting heat through the at least one insulative layer.

2. A heat reflective blanket according to claim 1 wherein said first outer layer is made of plastic.

3. A heat reflective blanket according to claim 2 wherein said second outer layer is made of plastic.

4. A heat reflective blanket according to claim 1 wherein said insulative elements are air filled pockets.

5. A heat reflective blanket according to claim 1 wherein said insulative layer has a thickness of at least 0.25 inches.

6. A heat reflective blanket according to claim 1 wherein said heat reflective layer comprises metallic foil.

7. A heat reflective blanket according to claim 6 wherein said metallic foil is made of aluminum.

8. A heat reflective blanket according to claim 6 wherein said metallic foil is made of gold.

9. A heat reflective blanket according to claim 6 wherein said metallic foil is made of silver.

10. A heat reflective blanket comprising:

a first moisture-impervious outer layer;

at least one insulative layer disposed below said first outer layer, said at least one insulative layer including an uppermost and lowermost insulative layer;

said insulative layer including a plurality of insulative elements disposed in spaced relation to each other on a surface of said insulative layer, with open spaces defined in said surface between said insulative elements;

a heat reflective layer disposed above and adjacent to the uppermost insulative layer, reflecting heat through at least one insulative layer; and a second moisture-impervious outer layer disposed below the lowermost insulative layer.

11. A heat reflective blanket according to claim 10 further comprising a second heat reflective layer disposed below and adjacent to the lowermost insulative layer.

12. A heat reflective blanket according to claim 10 further comprising a second heat reflective layer disposed between said insulative layers, reflecting heat through at least one insulative layer.

13. A heat reflective blanket according to claim 12 further comprising a third heat reflective layer disposed below and adjacent to the lowermost insulative layer.

14. A heat reflective blanket comprising:

a first moisture impervious outer layer;

a second moisture impervious outer layer;

an insulative layer disposed between the first and second outer layers;

said insulative layer including a plurality of insulative elements disposed in spaced relation to each other on a surface of said insulative layer, with open spaces defined in said surface between said insulative elements; and a heat reflective layer disposed between said insulative layer and one of said first and second outer layers.

15. The heat reflective blanket of claim 14 wherein said insulative elements impede the passage of heat through the portion of the insulative layer which comprises said insulative elements, and said open spaces permit the passage of heat through said insulative layer at the location of said open spaces.

16. The heat reflective blanket of claim 14 wherein said insulative elements are air filled pockets.

17. The heat reflective blanket of claim 14 including an additional insulative layer positioned between the first and second outer layers;

said additional insulative layer including a plurality of insulative elements disposed in spaced relation to each other on a surface of said additional insulative layer, with open spaces defined in said surface of said additional insulative layer between said insulative elements on said additional insulative layer.

18. The heat reflective blanket of claim 17 wherein said insulative elements of said additional insulative layer are air filled pockets.

* * * * *